(No Model.) 2 Sheets—Sheet 1.
W. M. JOHNS & D. P. SLATTERY.
CAR BRAKE.
No. 430,957. Patented June 24, 1890.
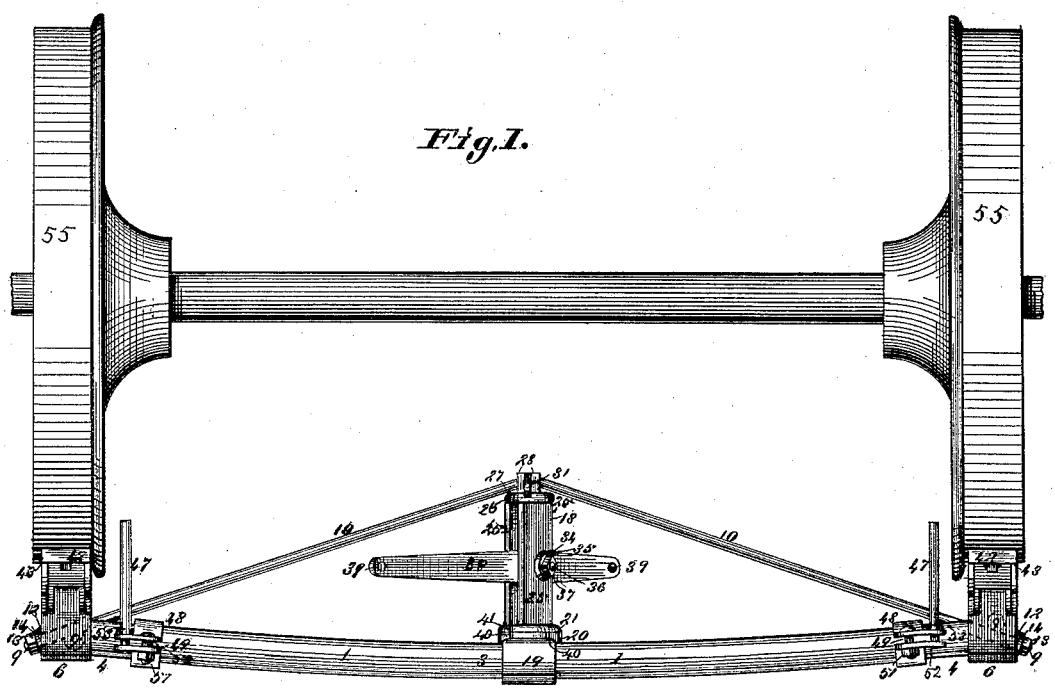
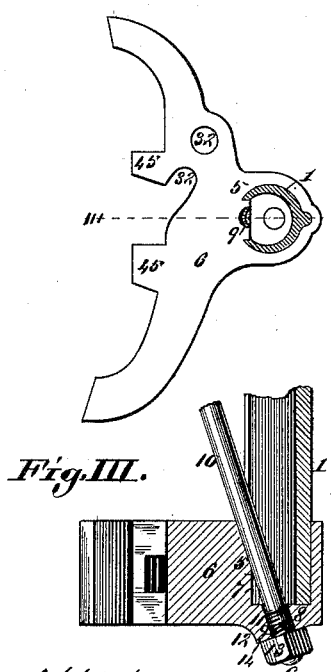
   
Fig.IV    Fig.V    Fig.VI    Fig.VII
 Fig.IX  
Fig.VIII   Fig.IX   Fig.X    Fig.XI
   
Fig.XII   Fig.XIII   Fig.XIV   Fig.XV
Inventors.
William M. Johns.
Dennis Paul Slattery.
By Knight Bros.
Attys
Attest:
Charles Rickles.
E. Arthur.
THE NORRIS PETERS CO., PHOTO-LITHO., WASHINGTON, D. C.

(No Model.) 2 Sheets—Sheet 2.
W. M. JOHNS & D. P. SLATTERY.
CAR BRAKE.
No. 430,957. Patented June 24, 1890.
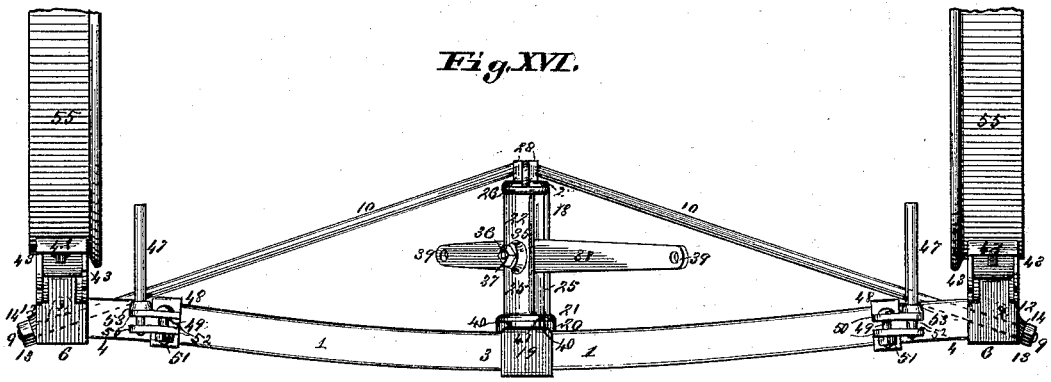
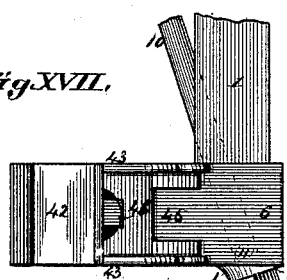
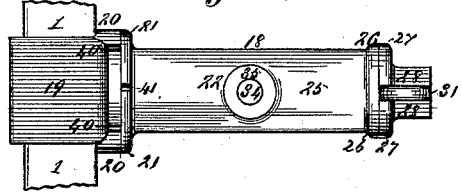
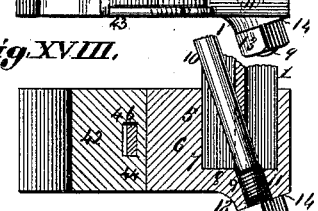
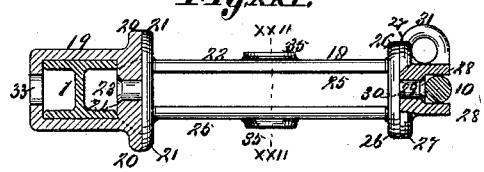
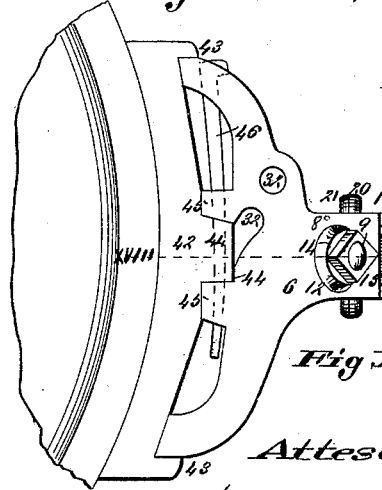
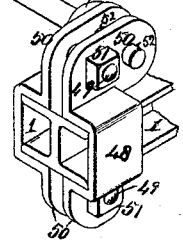
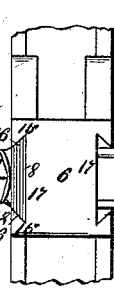
Attest:
Charles Pickles,
E. Arthur.
Inventors:
William M. Johns.
Dennis Paul Slattery.
By Knight Bros.
attys.

UNITED STATES PATENT OFFICE.

WILLIAM M. JOHNS AND DENNIS PAUL SLATTERY, OF ST. LOUIS, MISSOURI.

CAR-BRAKE.

SPECIFICATION forming part of Letters Patent No. 430,957, dated June 24, 1890.

Application filed March 17, 1890. Serial No. 344,173. (No model.)

*To all whom it may concern:*

Be it known that we, WILLIAM M. JOHNS and DENNIS PAUL SLATTERY, both of the city of St. Louis, in the State of Missouri, have invented a certain new and useful Improvement in Combined Adjustable Trusses, Brake-Beams, Brake-Heads, and Swivel-Brake Levers for Cars, &c., of which the following is a full, clear, and exact description, reference being had to the accompanying drawings, forming part of this specification.

This invention relates to a combined metal arc brake-beam, brake-heads in which the terminals of said beam are housed and held, the truss-rod that stiffens said beam, and the swivel-frame attached to said beam and that holds the truss-rod akimbo to strengthen the beam, and whose swivel carries and radially adjusts the operative brake-lever to its respective transferable right-hand, left-hand, or intermediate connections; and the invention consists in features of novelty hereinafter fully described, and pointed out in the claims.

Figure I is a top view of our adjustably-trussed arc brake-beam, its terminals housed in its brake-heads, the truss-rod that stiffens said beam, and the swivel-frame that holds said truss-rod akimbo and carries with swiveled adjustment the operative pivoted brake-lever. Fig. II is an enlarged side view on the inside of one of the brake-heads, with a section of the brake-beam housed therein, and the position of the truss-rod shown as it passes through the brake-head. Fig. III is an enlarged detail horizontal section of the brake-beam with its truss-rod and brake-head, taken on line III III, Fig. II, and shows a detail of the brake-beam and its truss-rod, the terminal of said brake-beam housed within, and of said truss-rod passing through said brake-head. Fig. IV is an enlarged end view of the preferred concavo-convex form of our brake-beam, and shows the reversed C shape of said beam, re-enforced by a longitudinal swell on the outer surface beyond the general contour of the convex arc of the beam. Fig. V is a like view of a modification in which the longitudinal swell is located on the concave arc inner surface of the beam. Fig. VI is a like view of a modification in which a double re-enforce swell is formed both outward and inward, respectively, from the general contour of the convex and concave surfaces of the beam. Fig. VII is a like view of a modification in which the transverse form of the beam is that of a reversed C without any re-enforce swell projecting (as in the last three previous figures shown) from the general contour of either the convex or concave surfaces of said beam. Fig. VIII is an enlarged end view of an inverted-E-shaped modification of our brake-beam, with a re-enforce swell extending from the middle of the concave surface of the beam. Fig. IX is a like view with the projecting swell on the convex surface of the beam. Fig. X is a like view in which the projecting swells extend from the general contour of both the concave and convex surfaces of the beam. Fig. XI is a like view without any such re-enforce swells as are shown in Figs. VIII, IX, and X. Fig. XII is an enlarged end view of another inverted-E-shaped modification of our brake-beam, in which the lateral arms or flanges curve, respectively, upward and downward immediately from the vertical portion of the beam, and which has an elongated swell or arm that projects inward from the concave surface of the beam. Fig. XIII is a like view with the elongated swell projecting from its convex side. Fig. XIV is a like view in which the projecting swells extend from both the concave and convex sides of the beam. Fig. XV is a like view minus the projecting swells shown in Figs. XII, XIII, and XIV. Fig. XVI is a like view to that of Fig. I, and shows a modification of our adjustable trussed arc brake-beam, in which modification the beam is formed in the shape of a letter H, said letter having a quarter-turn onto its side, the adjustable truss-rod and swivel-frame that holds said truss-rod akimbo being substantially and almost identically the same as the said parts shown in Fig. I. Fig. XVII is an enlarged detail top view, and shows the brake-head and the brake-shoe it carries, with the brake-beam and its truss-rod housed in and secured to said brake-head. Fig. XVIII is a horizontal section taken on line XVIII XVIII, Fig. XIX, and shows the housing of one of the terminals of the brake-beam in the brake-head, the location of the terminal of the truss-rod at that end in its passage through the end of the brake-beam and through the brake-head, and the boss projection on said brake-head. Fig. XIX is an enlarged side view of the brake-head and brake-beam, and shows the boxing attachment of the swivel-frame and the key attachment of the brake-shoe to said brake-head. Fig. XX is an enlarged top view of the swivel-frame that adjustably carries the operating pivoted brake-lever and stretches the truss-rod akimbo, and also shows the inclosing-boxing attachment of said swivel-frame to the brake-beam, the shape of which boxing is made conformable to the shape transversely of said brake-beam that is inclosed therein, being round in that of Fig. I and square in that of Fig. XVI. It also shows the V-shaped registering notches, respectively, in the collar of the boxing, and that of the swivel to register their respective positions when the swivel throws the operative brake-lever to an angle of forty-five degrees to the right or left hand. Fig. XXI is a side view of the same. Fig. XXII is a vertical section taken on line XXII XXII, Fig. XXI, and shows a detail of the brake-beam with the lever-carrier swivel turned to an angle of forty-five degrees for the adjustment of the operative lever. Fig. XXIII is an enlarged perspective view of the clamped buffer-pin that limits the lateral displacement of the brake-shoe and keeps it in position to enter into rubbing contact with the peripheral tread of the wheel; and Fig. XXIV is an enlarged front view of a modification of the brake-head, in the sides of which dovetail channel-grooves are cut, in one of which, respectively adapted to either a right or left hand attachment of the brake-head, a sliding head-plate is seated as a buffer-stay to the end of the brake-beam.

Referring to the drawings, 1 represents our curved or longitudinal arc brake-beam, which is preferably on its transverse line of a reversed C form, as shown in Figs. I, II, III, IV, V, VI, and VII, with an outwardly-projecting re-enforce swell 2 from its convex surface, as shown in Figs. I, II, III, and IV, which swell, alike numbered, however, may have an inward projection, as shown in Fig. V, a twofold projection, as shown in Fig. VI, or said brake-beam may be of a plane reversed C shape without any such re-enforce swell, or the general transverse contour of the brake-beam may be of a reversed E shape, as shown in Figs. VIII, IX, X, and XI, either with or without the re-enforce swell or swells 2. Otherwise the transverse form may be similar to those in the last four mentioned figures, except that the lateral arms of the E start to curve toward each other immediately from their start of divergence from the vertical portion thereof, as shown in Figs. XII, XIII, XIV, and XV, and the central re-enforce swell when provided is elongated into an arm or arms which, with the previously-described swells, are alike numbered 2, as of substantially the same construction; also, the transverse shape of said brake-beam may be constructed in the form of a letter H, having a quarter-turn onto the side of said H form, as shown in Figs. XVI, XVII, XVIII, XIX, XX, XXI, XXII, XXIII, and XXIV, in the last eight of which figures enlarged detail and other views are given of the brake-beam, the brake-head in which the ends of said brake-beam are housed, the brake-shoe with its key-locking attachment to said brake-head, the truss-rod showing the adjustable means of seating and securing the same, and the swivel-frame with its swivel that adjustably carries the operative pivoted lever, said views with the other enlarged views from Figs. II to XV, inclusive, more clearly defining the respective formation and combination of said parts than can be conveyed in the general views in Figs. I and XVI.

We will now proceed to describe said and other coadjutant parts with their respective means of construction, attachment, and essential combination.

The main central portion of the brake-beam 1 is curved outward to the arc of a circle, so as to stiffen the same under action, the said arc 3 being sprung from the eccentrically-divergent lines at its ends a short distance from the brake-head, as shown in Figs. I and XVI. These eccentrically-divergent ends 4 are thus turned, so as to fit in the box-housing 5 in the brake-head 6, which housing is formed parallel with the front of said brake-head. By this eccentric construction of the beam the arc form stiffens the beam, and the ends being divergent from the arc line avoid the necessity of having their box-housing within the brake-head made angling in said head, and this part of our construction has fivefold advantages, to wit: First, the brake-head is not weakened to the same degree as it would be if the box-housing angled through it to conform to the arc form of the brake-beam; second, the direct pressure when braking is fair and square from the pressure side of the brake-beam against its pressed seat within the box-housing of the brake-head, and thus gains the advantage of direct instead of approximately-direct action in braking; third, the tendency when braking from the consequent pressure on the apex of the arc of the beam to adversely straighten out the same and slide endwise on its inclined seat in the brake-head is thus materially avoided by the presentation of a square recipient seat 7 as the receiver of said pressure in the place of said inclined seat, along which incline the beam would be encouraged to creep, and thus adversely induce toward its straightening under pressure, so as to materially reduce the stiffness of said beam; fourth, the beam not being, as last stated, encouraged to straighten out on an inclined seat, it would not, when under braking stress, press endwise so adversely against the buffer-terminal 8 of the box-housing, so that it would not as much endanger the bursting of the same or the lateral displacement of the brake-shoe on the periphery of the wheel, and, fifth, the return divergent curves at the ends of the arc beam prevent their largely adverse interference with the passage of the screw-threaded attachment ends 9 of the angle truss-rod 10 as they pass through the concave ends of said brake-beam to their perforate seats 11 in the buffer end terminal of the box-housing in the brake-head and through the boss projection 12 on the outside thereof.

It will be seen that when the preferred form of our brake-beam (shown in Figs. I, II, III, and IV) is used, as definitely shown in Figs. II and III, as also when the modifications shown inclusive from Figs. V to XI and in Fig. XV are used, the said brake-beam is entirely out of interference with the seating of the screw-threaded ends of the truss-rod, which pass freely through the concavity of said brake-beam and through the said perforate seats in said brake-head, and the tension of said truss-rod is there adjusted and held to its adjustment by the screw-nuts 13, which engage on the screw-tips of said rod and are seated on the bevel-faces 14 of said boss projections.

The buffer-terminal end 8 of the box-housing 5 in the brake-head may be integral with the other parts of said brake-head, as shown in Figs. II, III, and XVIII, or when it is desired to use brake-heads that are adapted to be transferable from one end of the brake-beam to the other—that is, to either a right or left hand presentation—the said buffer end that prevents the longitudinal projection of the ends of the brake-beam beyond the brake-head may be, as shown in Fig. XXIV, of disintegral formation, and then the said buffer end 8, with the projecting bevel-boss it carries, is in the form of a head-plate having dovetail edges 15, that fit and slide in the overlap bevel-edges 16, respectively, of one or other of the dovetail slots 17, that are provided on each side of said brake-head. It will thus be seen that by the transfer of the dovetailed buffer head-plate 8 from one dovetail seat to the other the brake-head is made adjustable to either a right or left hand presentation, and can thus be used on either end of the brake-beam.

The conically-bent angle truss-rod 10 is set and held akimbo by the swivel truss-block frame 18, whose sleeve-boxing 19 embraces the middle of the brake-beam, so as to be firmly held thereby and itself to firmly hold said swivel-frame and the apex of the conical truss-rod it carries, and on which it exerts its tension. The said box-sleeve is provided with a flange-collar 20, which constitutes a swivel-seat, against which the swivel collar-flange 21 of the compound adjustable swivel truss-block 22 engages. The said swivel truss-block is constituted integrally of said swivel collar-flange 21 at the end next the sleeve-boxing 19, which collar-flange is pivotally secured to the collar-flange 20 by the pivot-rivet 23, that passes through and is secured in its pivot-bearing seat 24 in said flange-collars, and from said collar-flange 21 are extended the two longitudinally-parallel bars 25, integral with said collar, and a second integral swivel collar-flange 26 at the projectile ends of said parallel bars, which collar-flange is pivotally secured to the boss-collar 27, integral with which are the bifurcated arms 28, within which the apex of the conically-bent truss-rod is seated. The said boss-collar, with its bifurcated arms, is pivotally secured to the swivel collar-flange 26 by the pivot-rivet 29, which passes through and is secured in its pivot-bearing seat 30 in said collar-boss and swivel collar-flange.

A boss-ring 31, integrally attached to the boss-collar 27 and to one of the bifurcated arms 28, provides means for the attachment of the customary safety-hanger to the conically-trussed brake-jaws.

32 represents perforations in the brake-head, that also provide means for the usual hanger-slings from the car to said brake-heads.

The brake-beam is set at just the requisite angle in the brake-head to provide the requisite underhung presentation to said brake-head and the brake-shoe it carries to adjust its attitude to its rubber contact with and below the center of the periphery of the wheel.

33 represents an open port at the outer end of the sleeve 19, which is provided for the introduction of a buffer-stay to hold the head of the rivet 23 in its perforate seat 24 (preparatory to the introduction of the brake-beam) while said rivet is being riveted.

34 represents perforate bearings that pass through the integral boss projections 35 on the parallel swivel-bars 25, through said bars, and through the operating-lever, in which bearings the fulcrum-bolt 36 is seated, the screw-tip of said bolt having the screw-nut 37 screw-seated thereon.

38 represents the fulcrum-pivoted operating-lever, which is seated and works between the parallel bars 25 of the adjustable compound swivel-block, and is held to its pivoted fulcrum-bearing by said fulcrum-bolt 36. 39 are perforations near the ends of said operating-lever that provide the means for attachment of the usual operative brake-rods.

Now it will be seen that the above-described compound swivel adjustment of the operating-lever provides the means for respective transfers of the brake to a right and left hand attachment, and vice versa, as the readjustment of its operative connections when transferred from car to car may require. The two registering notches 40 on the flange-collar 20 and the notch 41 on the flange-collar 21 indicate, respectively, when brought into registry with each other the required respective positions of said collars to throw the operative lever into working position either for a right or left hand attachment, as the case may be.

42 represents the removable brake-shoes, which are secured to the brake-heads 6, the projecting flanges 43 of which shoes embrace said brake-heads, and the bevel-topped central perforated lugs 44 fit in between the perforate projecting lugs 45 of the brake-head. When said shoes are in position, said perforations in the respective lugs 44 and 45 register together and the keys 46 are seated therein and secure said connection.

47 represents buffer safety-pins for preventing the lateral displacement of the brake-beam with the brake-heads and brake-shoes, so that the brake-shoes cannot by accidents (that pre-eminently call for the work of the brakes) be thrown laterally out of working contact with the periphery of the wheels.

48 represents double-clip clamps that are adjustably seated around the brake-beam, to which they are secured by the screw-bolts 49, which pass through and are seated in the perforate flanges 50 of said clamps, and are there held by the screw-nuts 51.

The attachment ends of the buffer safety-pins 47 are placed within their perforate seats 52 in the flanges 50 of the clip-clamps 48, they being entered therein until stayed by their integral boss-collars 53 coming in contact with the inner flange 50 of the clip. The said attachment ends of the safety buffer-pins enter freely into their perforate seats in said flanges before the upper flanges of said clips have been tightened by the screwing up of the nut 51 on the upper bolt 49, which operation cants the lugs of the clip sufficiently to make a tight nip hold of said buffer safety-pins, and at the same time the clip-clamps are firmly secured around the brake-beam at the required distance from its ends to insure the right lateral presentation of the brake-shoes to the periphery of the wheels 55, as the safety-pins prevent any extreme lateral displacement thereof.

The compound arc shape of the beam, with its eccentric divergent ends, is secured to the form of the beam in rolling.

The box-sleeve 19, that embraces the middle of the brake-beam, and on whose collar-flange the compound swivel that carries the operating fulcrum-lever is pivoted, is shaped to fit the transverse shape of the brake-beam. Thus in the enlarged views shown in Figs. XX and XXI it is shown of a rectangular form, as the modified H form of beam was immediately before shown in Figs. XVI, XVII, XVIII, and XIX; but it is not to be understood that said rectangular form of said box-sleeve is used in the preferred curvilinear transverse form of said brake-beam, or, indeed, of any of the transverse curvilinear forms, as it is evident that said box-sleeve would be required to conform to the transverse form of said brake-beam.

We much prefer the reversed C form of the brake-beam, as thereby we secure the greatest strength with the least weight, and at the same time provide an open passage for the attachment ends of the truss-rods. The said transverse curvilinear contour of the reversed C brake-beams avoids all angular points of weakness, and while its arc longitudinal form coadjutantly with the conical truss expanded akimbo by the compound swivel-frame secures great strength and stiffness longitudinally the arc shape in cross-section of this our preferred form also secures great strength transversely.

Among the advantages secured by this invention are:

First. The boxes in the brake-heads form a complete housing for the terminals of the brake-beams, the terminal of which boxes prevents their longitudinal displacement inward on the brake-beam and the truss-rod their longitudinal displacement outward, and there are consequently no fragile bolt attachments of said parts that are liable to fail and give out when they are most urgently needed to stand to their work.

Second. By the use of this brake-beam a much stronger beam is secured with a lighter weight of material than usual.

Third. The brake-beam, although much stronger than others now in general use for its operative functions, yet in case of an accident to the train or brake, if the beam should drop, as (when accidents occur) it frequently does, in front of the wheels, then the flanges of the beam, which when in operative position are abundantly strong to withstand the brake strain, yet do the light flanges readily mash under the wheels and the thin web conforms to and scarcely obstructs the same, instead of as with the solid beam-brake, which too frequently on such occasions derails the train.

Fourth. This brake-beam is of a concavo-convex form, arching from the tension brake strain, and consequently much stiffer.

Fifth. The box attachment of the swivel truss-block or frame-boxes in the middle of the brake-beam, instead of being secured thereto by bolts or other fragile means that frequently break themselves, and by their perforate attachment weaken the beam where it is subject to the greatest strain.

Sixth. The compound swivel truss block or frame that carries the fulcrum-lever swivels round to either a right or left hand adjustment or to any intermediate position of said lever, so that our brake-beam is attachable to both right and left hand operative brake devices on cars.

Seventh. The said compound swivel truss-frame, besides its swiveling advantages above noted, is made much lighter and at the same time much stronger than can be any solid truss-bar. Thus both the undue weight and weakness of the solid truss-bar are alike avoided.

Eighth. In case of adverse contortion of the brake strain from accident, (running over a broken rail or other obstruction that yet has not derailed the train,) instead of, as with the usual solid unswiveled truss-bar, being frequently bent or broken, so as to vitiate its capacity, this compound swivel truss-frame, besides being much stronger to withstand the adverse contortion and strain, conforms itself by swiveling to any said casual changes in the line of draft and swivels back again after said adverse strain or obstruction to its normal position is passed.

Ninth. The truss-tension on the beam can be almost instantly changed on the car or elsewhere by loosening one nut of the truss-rod, thereby adjusting the pressure on the strut or brake-jaw.

Tenth. By the respective adjustment of the trussing-nuts at the terminals of the truss-rods the brake is readily adjusted to equalize the friction of the corresponding shoes or bring them to their true presentation.

Eleventh. By the use of our compound swivel truss block or frame, that in conjunction with other features of this invention is adjustable to alternate from a right to a left hand action, and vice versa, this device adapts itself to both right and left hand beams, and so railroad companies avoid the necessity of keeping a mixed stock of beams on hand.

Twelfth. The longitudinal arc center form of the brake-beam, as also the transverse arc form of the preferred form thereof, adds largely to its strength and stiffness.

Thirteenth. The eccentric divergent form of the ends of the brake-beam and the consequent straight box-housing in the brake-head to receive the same make a stronger junction and apply the brake-pressure from the beam to the brake-head on parallel line with that from the brake-shoe to the periphery of the wheel, which, if the arc shape of said beam was continued to its ends, would not be the case.

Our invention is alike adapted for a brake attachment to passenger or freight cars, as also to locomotives or any other railroad rolling-stock to which brakes can be advantageously attached.

The object of the compound fulcrum brake-lever as a part of the combination is evident. The jaw with the fulcrum-lever can be adjusted to any angle required, or can be changed from left to right, and vice versa, almost instantaneously.

This invention also obviates the present necessity of railroad companies having to keep a stock of two kinds of beams, as it is alike adapted to either.

The ends of the truss-rods are struck back so as to enlarge their diameter previous to cutting the screw-thread thereon, thus re-enforcing their strength where it is most required. While the brake-beam is preferably made of rolled steel, it and the swivel-frame, brake-heads, &c., may be constructed of any suitable material.

We claim as our invention—

1. A combined adjustable trussed concavo-convex brake-beam having an arc or camber center and reversibly-turned ends that conform to the line of presentation of the brake-shoes, an interchangeable brake-head provided with a box-housing 5, in which either end of the brake-beam is housed, the entrance to which housing on each side said brake-head is provided with dovetail slots 17, and the buffer bevel slide-plate that fits in either of said dovetail slots 17, respectively, as it is required to be adapted to either a right or left hand presentation on said brake-beam, the end of which it confines in the housing, substantially as and for the purpose set forth.

2. A combined adjustable trussed brake-beam, brake-head, and swivel brake-lever for cars, &c., having the combination of a concavo-convex brake-beam, the brake-heads provided with the boxes 5 within said brake-heads, in which the terminals of said brake-beam are housed and held, and the interchangeable locking-shoes keyed to said brake-heads, substantially as and for the purpose set forth.

3. A combined adjustable trussed brake-beam, brake-head, and swivel brake-lever for cars, &c., having a concavo-convex brake-beam with a curved arc center portion and divergent ends that are approximately on parallel line with the line of contact-pressure of the brake-shoes on the periphery of the wheel, the re-enforce longitudinal swells 2 on said brake-beams, and the brake-heads provided with boxes 5 therein, in which the ends of said brake-beams are housed, substantially as and for the purpose set forth.

4. A combined adjustable trussed brake-beam, brake-head, and swivel brake-lever for cars, &c., having the combination of the brake-beams, the boxing-sleeve 19, in which the middle of said beam is embraced, the compound swivel truss block or frame swiveled to said boxing-sleeve, the bifurcated swiveled truss-rod bearer, the conically-bent truss-rod seated within the forks of said bearer, and the re-enforce enlargement of the screw-threaded ends of said truss-rod, substantially as and for the purpose set forth.

5. A combined adjustable trussed brake-beam, brake-head, and swivel brake-lever for cars, &c., having the combination of the concavo-convex brake-beam, the brake-heads provided with boxes in which the terminals of said brake-beam are housed, the compound swivel truss block or frame, the sleeve-boxing attachment of said block to the middle of the beam, the bifurcated truss-rod bearer pivotally secured to said compound truss-swivel, the conically-bent truss-rod carried by said bearer, the brake-heads being provided with perforations in which the terminals of the truss-rod are seated, and the trussing screw-nuts that adjust the tension of the truss-rod, substantially as and for the purpose set forth.

6. A combined adjustable trussed brake-beam, brake-head, and swivel brake-lever for cars, &c., having the combination of the concavo-convex brake-beam, the brake-heads provided with boxes in which the terminals of said brake-beam are housed, the compound swivel truss block or frame, the boxed attachment of said block to the middle of said brake-beam, the bifurcated truss-rod bearer, the conically-bent truss-rod carried by said bearer and truss adjusted to said brake-heads, the buffer safety-pins 47, and the attachment-clips 48, that carry said pins and are secured to near the terminals of said brake-beam to guide the presentation of the brake-shoes, substantially as and for the purpose set forth.

7. The combination of a concavo-convex brake-beam, brake-heads in which the ends of the beam are housed, and a truss-rod the ends whereof pass through the beam and are secured to the brake-heads, the form of the beam affording an open passage for the ends of the truss-rod, whereby any cutting or weakening of the beam is avoided, substantially as described.

8. The combination of a brake-beam, a strengthening truss-rod, a swiveling king-post or frame, and a brake-lever supported between the bars of such frame, whereby such lever may be adjusted for various connections, substantially as described.

WILLIAM M. JOHNS.
    DENNIS PAUL SLATTERY.

In presence of—
 BENJN. A. KNIGHT,
 SAML. KNIGHT.